United States Patent
Zhang et al.

(10) Patent No.: US 11,960,114 B2
(45) Date of Patent: Apr. 16, 2024

(54) BACKLIGHT MODULE AND DISPLAY DEVICE

(71) Applicants: CHUZHOU HKC OPTOELECTRONICS TECHNOLOGY CO., LTD., Chuzhou (CN); HKC CORPORATION LIMITED, Shenzhen (CN)

(72) Inventors: Mei Zhang, Chuzhou (CN); Haoxuan Zheng, Chuzhou (CN)

(73) Assignees: CHUZHOU HKC OPTOELECTRONICS TECHNOLOGY CO., LTD., Chuzhou (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/088,735

(22) Filed: Dec. 26, 2022

(65) Prior Publication Data

US 2023/0408752 A1    Dec. 21, 2023

(30) Foreign Application Priority Data

Jun. 17, 2022 (CN) .......................... 202210686991.8

(51) Int. Cl.
*F21V 8/00* (2006.01)

(52) U.S. Cl.
CPC ......... *G02B 6/0088* (2013.01); *G02B 6/0055* (2013.01); *G02B 6/0078* (2013.01)

(58) Field of Classification Search
CPC .................................................. G02B 6/0078
See application file for complete search history.

(56) References Cited

U.S. PATENT DOCUMENTS

| | | | | |
|---|---|---|---|---|
| 2011/0026273 | A1* | 2/2011 | Bourdelais | G02B 6/0091 362/613 |
| 2011/0026274 | A1* | 2/2011 | Bourdelais | G02B 6/0091 362/613 |
| 2013/0021818 | A1* | 1/2013 | Baek | G02B 6/0025 362/613 |
| 2021/0409584 | A1* | 12/2021 | Kojima | G09G 3/36 |

FOREIGN PATENT DOCUMENTS

| | | |
|---|---|---|
| CN | 103742840 A | 4/2014 |
| CN | 111323968 A | 6/2020 |
| CN | 114203069 A | 3/2022 |

* cited by examiner

*Primary Examiner* — Keith G. Delahoussaye

(57) ABSTRACT

A backlight module and a display device are disclosed. The backlight module includes a back plate, an assembled light plate composed of multiple light plates, and a pressure bar. The assembled light plate is fixed to the back plate by the pressure bar. The pressure bar includes a fixing portion and a connecting portion. One end of the connecting portion goes through the gap, and the other end is connected to the fixing portion. The fixing portion extends from the gap to the light plates on both sides to form a first abutting portion and a second abutting portion. The surfaces of the first and the second abutting portions adjacent to the light plates are level and flush with each other. The first and the second abutting portions respectively abut and firmly press the light-emitting surfaces of the light plates on both sides. The fixed portion covers the entire gap.

18 Claims, 5 Drawing Sheets

BACKLIGHT MODULE AND DISPLAY DEVICE

CROSS-REFERENCE TO RELATED APPLICATIONS

This application claims the priority and benefit of Chinese patent application 2022106869918, titled "Backlight Module and Display Device" and filed Jun. 17, 2022 with China National Intellectual Property Administration, the entire contents of which are incorporated herein by reference.

TECHNICAL FIELD

The present application relates to the field of display technology, and in particular, to a backlight module and a display device.

BACKGROUND

The description provided in this section is intended for the mere purpose of providing background information related to the present application but doesn't necessarily constitute prior art.

With the continuous development of display technology, the demand for large-sized display panels in on the rise. However, due to the limitations of the process, the yield of large-sized display panels is low, and the production method of assembling multiple light plates may be used in the industry.

However, when assembling the light plates and the back plate, multiple light plates may be fixed to the back plate by gluing, resulting in a height difference between different light plates and warping of the light plates after a long time of use, resulting in uneven brightness of the display panel, affecting the display effect.

SUMMARY

It therefore one purpose of the present application to provide a backlight module and a display panel, so that the light plates of the assembled light plates have the same height and are on the same horizontal plane, the brightness of the image is more uniform, and the edges of the light plates are not warped.

The present application discloses a backlight module. The backlight module includes a back plate and an assembled light plate. The assembled light plate is composed of a plurality of light plates. A gap is defined between two adjacent light plates. The backlight module further includes a pressure bar, and the assembled light plate is fixed to the back plate through the pressure bar. The pressure bar includes a fixing portion and a connecting portion. One end of the connecting portion passes through the gap, and the other end is connected to the fixing portion. The fixing portion extends from the gap to the light plates on both sides to form a first abutting portion and a second abutting portion. The surfaces of the first abutting portion and the second abutting portion adjacent to the respective light plates are flush with each other and are horizontal. The first abutting portion and the second abutting portion respectively abut and firmly press the light-emitting surfaces of the respective light plates on both sides. The fixed portion covers the entire gap.

Optionally, a light supplementation structure is arranged on the surface of the fixing portion away from the connecting portion.

Optionally, a surface of the fixing portion away from the connecting portion is indented toward the back plate to form an arc structure.

Optionally, the backlight module further includes an optical film and a support column. The optical film is arranged on the side of the assembled light plate away from the back plate. The support column is arranged between the optical film and the fixing portion. One end of the support column is connected with the fixed portion, and the other end supports the optical film. The depth of the support column connected to the fixing portion along the direction from the optical film to the back plate is adjustable.

Optionally, the back plate is provided with a through slot at the position corresponding to the connecting portion, and the side of the back plate facing away from the assembled light plate is provided with a pressure bar fixing protrusion. The pressure bar fixing protrusion is arranged at a slot edge position of the through slot. The connecting portion passes through the through slot and is fixedly connected with the side surface of the pressure bar fixing protrusion.

Optionally, the backlight module further includes a buffer member disposed in the gap and located between the connecting portion and the light plate.

Optionally, the fixing portion is made of a transparent material.

Optionally, the fixing portion further includes a main body structure and a plurality of protruding structures arranged on the main body structure. The main body structure covers the gap. The plurality of the protruding structures are evenly arranged on each of both sides of the main body structure, and the sides of the plurality of the protruding structures abutting on the light-emitting surface of the light plates are level and flush with each other. A lamp bead is arranged between two adjacent protruding structures of the light plate on the same side of the main body structure.

Optionally, the pressure bar also includes a plurality of lamp beads. The plurality of the lamp beads are arranged on the fixing portion, and are evenly arranged on the surface of the fixing portion away from the connecting portion along the length of the gap.

The present application further discloses a display device, which includes a display panel and the above-mentioned backlight module, where the backlight module provides a backlight source for the display panel.

Compared with the solution of fixing the assembled light plates to the back plate by means of gluing, the solution of these embodiments fixes the assembled light plates to the back plate through a T-shaped pressure bar, and the fixing portion in the pressure bar includes a first abutting portion and the second abutting portion, where the surfaces of the first abutting portion and the second abutting portion contacting the light plates are level and flush with each other, which can well avoid the uneven height of different light plates after the assembled light plates are fitted onto the back plate, and it can also prevent the light plates from warping during later use. Furthermore, the fixing portion covers the entire gap, so that the contact surface between the pressure bar and the edges of the light plates is greater, and the edges of the light plates are more evenly pressed by the pressure bar, which will not cause damage to the light plates due to excessive local forces.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

Figure 1:
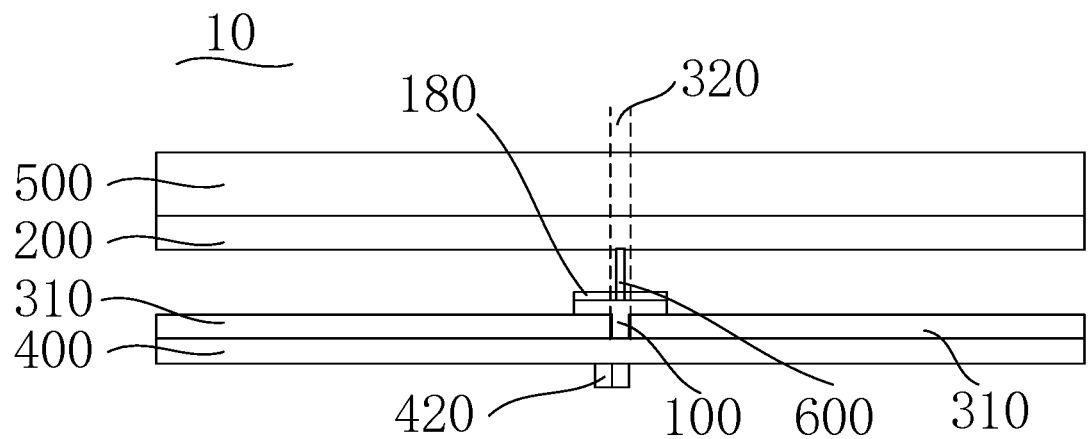
FIG. 1 is a schematic diagram of a display device provided by the present application.

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

FIG. 1 is a schematic diagram of a display device provided by the present application. As shown in FIG. 1, the present application discloses a display device 10, the display device 10 includes a display panel 500 and a backlight module 20 arranged in sequence. The backlight module 20 includes an optical film 200, an assembled light plate and a back plate 400. The assembled light plate is fixed to the back plate 400. The optical film 200 is disposed on the side of the assembled light plate away from the back plate 400. The assembled light plate provides a light source for the display panel 500.

The assembled light plate is composed of a plurality of Mini LED light plates or ordinary LED light plates. A gap 320 is formed between two adjacent light plates 310. The assembled light plate of the present application is fixed to the back plate 400 through the pressure bar 100. Two adjacent light plates 310 are at the same horizontal height by the pressure bar 100, so as to avoid the situation that the light plates 310 have different heights. Thus, the different regions of the display panel 500 are prevented from having different brightnesses due to the different heights of the light plates 310, so that the brightness of the display panel 500 is more uniform. Specifically, the following several embodiments are used as examples for explanation.

Embodiment 1

Figure 2:
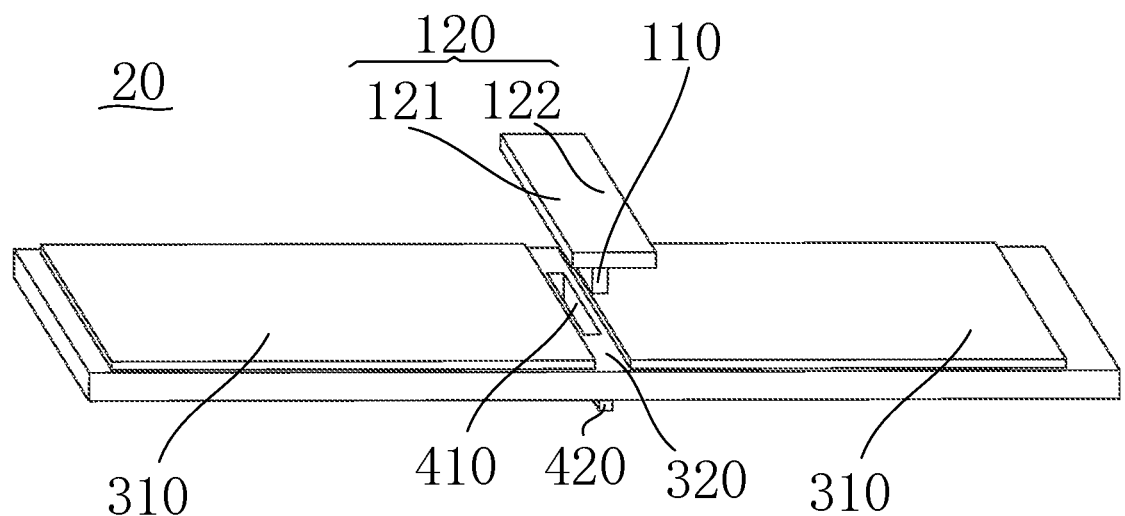
FIG. 2 is a perspective view of a backlight module provided by a first embodiment of the present application.
Figure 3:
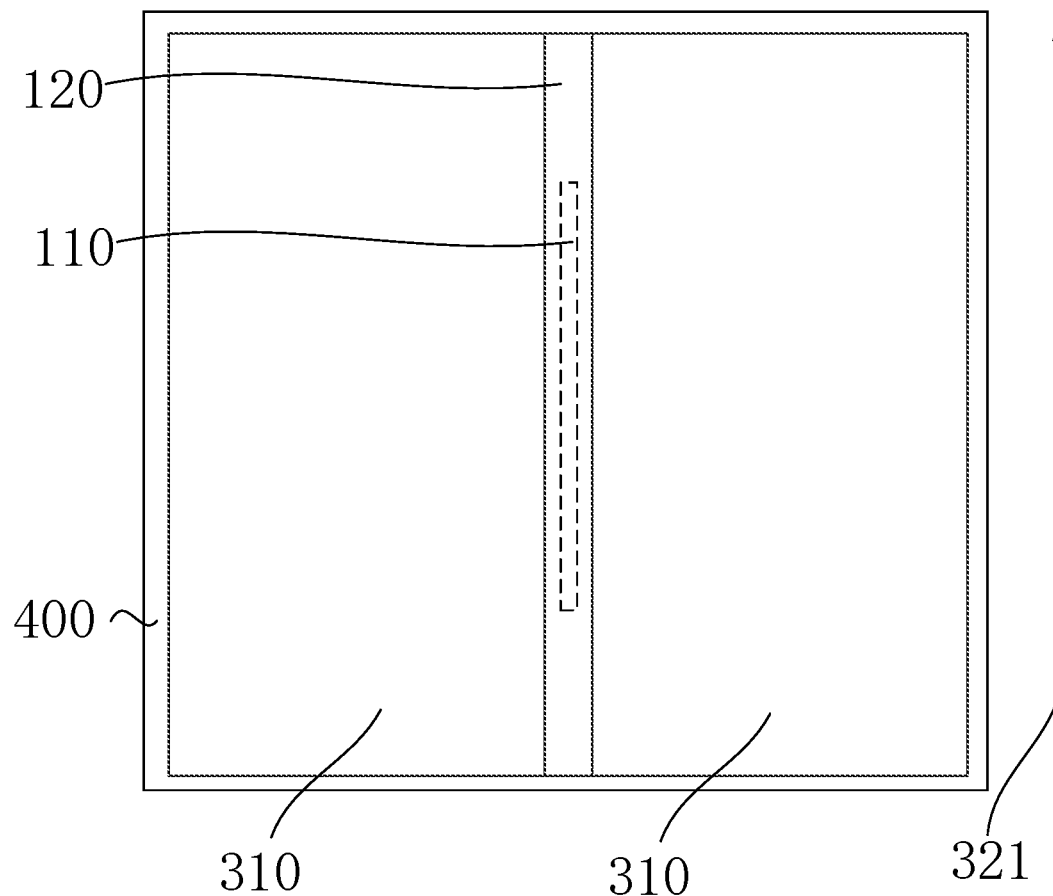
FIG. 3 is a top view of a backlight module provided by the first embodiment of the present application.

FIG. 2 is a perspective view of a backlight module provided by the first embodiment of the present application. FIG. 3 is a top view of a backlight module provided by the first embodiment of the present application. As shown in FIGS. 1 to 3, the first embodiment of the present application discloses a backlight module 20, the backlight module 20 includes an assembled light plate and a back plate 400. The pressure bar 100 includes a fixing portion 120 and a connecting portion 110. One end of the connecting portion 110 is connected to the back plate 400 through the gap 320. The other end is connected to the fixing portion 120. The fixing portion 120 extends from the gap 320 to the light plates 310 on both sides to form a first abutting portion 121 and a second abutting portion 122. The surfaces of the first abutting portion 121 and the second abutting portion 122 adjacent to the light plates 310 are level and flush with each other. The first abutting portion 121 and the second abutting portion 122 are respectively abutted against and pressed firstly against the light-emitting surfaces of the light plates 310 on both sides. The fixing portion 120 covers the entire gap 320.

Compared with the solution of fixing the assembled light plate to the back plate 400 by means of gluing, in the solution of this embodiment the fixing portion 120 of the T-shaped pressure bar 100 includes the first abutting portion 121 and the second abutting portion 122, and the surfaces of the first abutting portion 121 and the second abutting portion 122 that are in contact with the light plates 310 are level and flush with each other, which effectively prevents uneven heights of different light plates 310 after the assembled light plate is fitted onto the back plate 400, and it can also prevent the light plates 310 from warping during later use. Furthermore, the fixing portion 120 covers the entire gap 320, the contact surface between the pressure bar 100 and the edges of the light plates 310 is more, the edges of the light plates 310 are more uniformly pressed by the pressure bar 100, and the light plates 310 will not be damaged due to excessive local forces.

A light supplementation structure 180 may also be arranged on the fixing portion 120 to supplement light for the gap 320. That is, the surface of the fixing portion 120 away from the connecting portion 110 is defined as the upper surface of the fixing portion 120, and the orientation of the upper surface is the same as the orientation of the light-emitting surface of the light plates 310. Providing the light supplementation structure 180 on the upper surface of the fixing portion 120 can reflect the light emitted by the lamp beads 330 on the light plates 310 toward the upper side of the gap 320 through the light supplementation structure 180, so as to solve the problem of dark lines corresponding to the gap 320 in the display device 10. The light supplementation structure 180 includes a coating with high reflectivity applied on the upper surface of the light plates 310, and may also be a reflective film disposed on the upper surface of the light plate 310, or a photoluminescent agent that can emit light after absorbing light.

Moreover, taking the length direction of the gap 320 as the first direction 321, then the length of the connecting portion 110 along the first direction 321 is smaller than the length of the fixing portion 120 along the first direction 321. In the present application, a through slot 410 is also provided at the position of the back plate 400 corresponding to the connecting portion 110, and a pressure bar fixing protrusion 420 is arranged on the side of the back plate 400 away from the assembled light plate. The pressure bar fixing protrusion 420 is arranged at the slot edge position of the through slot 410. The connecting portion 110 passes through the through slot 410 and is fixedly connected to the side surface of the pressure bar fixing protrusion 420. The fixed connection method between the pressure bar fixing protrusion 420 and the connecting portion 110 can be that they are fixedly connected by a screw going through the pressure bar fixing protrusion 420 and the connecting portion 110. In this way, there is no need to increase the thickness of the back plate 40, and the lower surface of the pressure bar fixing protrusion 420 away from the light plate 310 is horizontally flush with the lower surface of the connecting portion 110 away from the fixing portion 120. Of course, the pressure bar fixing protrusion 420 can also be directly connected with the connecting portion 110 by means of bonding or gluing. Compared with the solution of fixing the light plate 310 to the back plate 400 by arranging a screw structure on the side where the light plate 310 and the back plate 400 are attached, and then passing one end of the screw through the back board 400 to be connected to the light plate 310, the solution of this embodiment doesn't need to perform secondary processing on the light plate 310, thereby avoiding damage to the light plate 310 during the secondary processing of the light plate 310, reducing the processing cost of the light plate 310, and improving the production efficiency.

Figure 4:
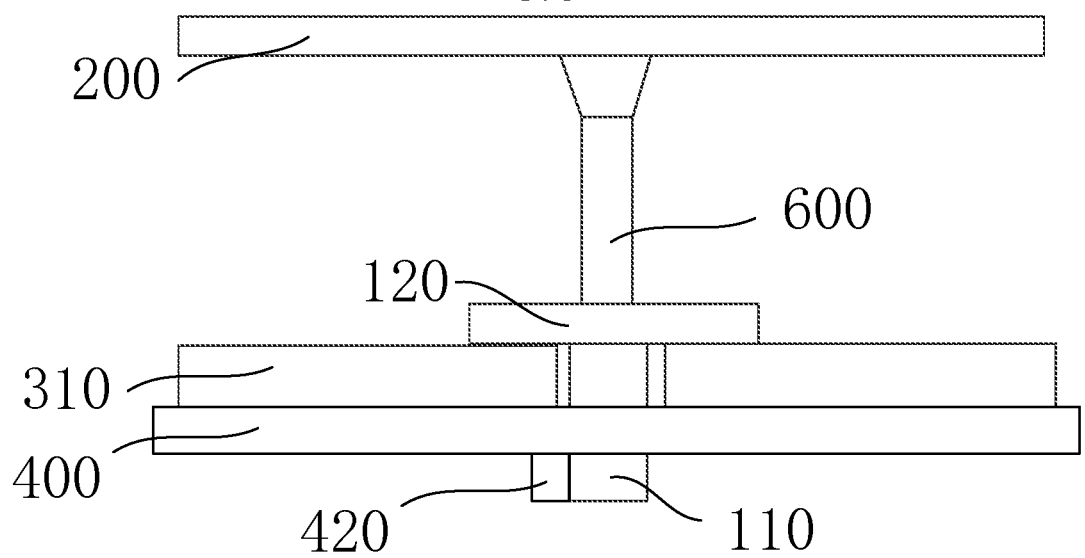
FIG. 4 is a schematic diagram of another backlight module provided by the first embodiment of the present application.

FIG. 4 is a schematic diagram of another backlight module provided by the first embodiment of the present application. As shown in FIG. 4, the backlight module 20 further includes an optical film 200. A certain distance is required between the optical film 200 and the assembled light plate. In this embodiment, a support column 600 is added to the pressure bar 100, and the support column 600 is arranged between the optical film 200 and the fixing portion 120. One end of the support column 600 is screwed or threadedly connected with the fixing portion 120, and the other end supports the optical film 200. The depth of the support column 600 being screwed to the fixing portion 120 is adjustable. That is, the distance between the assembled light plate and the optical film 200 can be adjusted by adjusting the depth of the screw connection between the support column 600 and the fixing portion 120.

Compared with the existing solution in which the support structure is directly arranged on the light-emitting surface side of the light plate 310 to support the optical film 200, the support column 600 in this embodiment is directly arranged on the fixing portion 120, and there is no need to reserve a position on the light plate 310 and arrange a support structure in the reserved position, which is beneficial to improve the yield of the light plate 310. Furthermore, the distance between the assembled light plate and the optical film 200 can be adjusted through the depth of the screw connection between the support column 600 and the fixing portion 120. In different display devices 10, the required heights between the assembled light plate and the optical film 200 are different, and the depth of the screw connection between the support column 600 and the fixing portion 120 can be adjusted without customizing the support column 600 with the corresponding height, thereby improving the universality of the support column 600.

Figure 5:
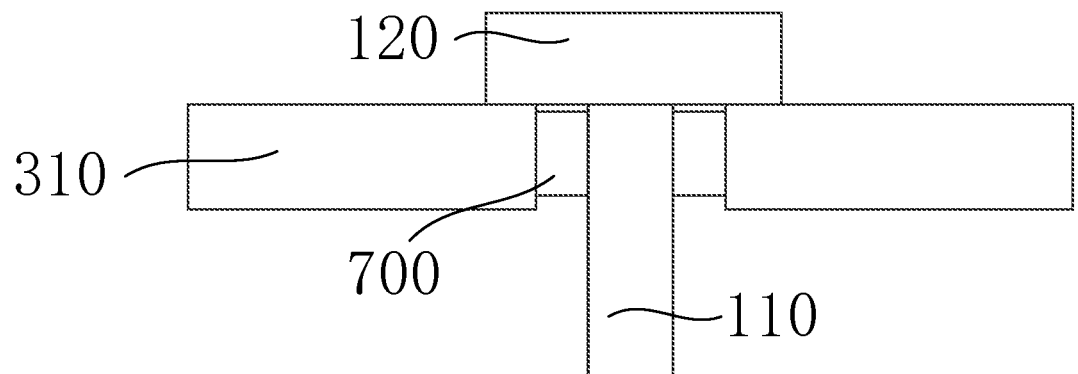
FIG. 5 is a schematic diagram of a pressure bar fitted with a light plate provided by the first embodiment of the present application.
Figure 6:
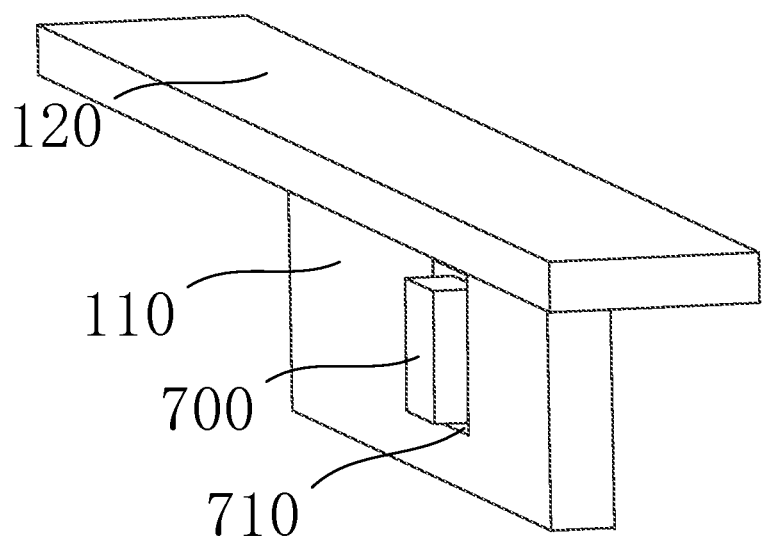
FIG. 6 is a schematic diagram of a pressure bar according to the first embodiment of the present application.

FIG. 5 is a schematic diagram of a pressure bar fitted with a light plate provided by the first embodiment of the present application. FIG. 6 is a schematic diagram of a pressure bar according to the first embodiment of the present application. As shown in FIGS. 5 and 6, during the use of the light plates 310, the light plates 310 will expand due to thermal expansion and contraction, resulting in displacement of the light plates 310. In this embodiment, a buffer member 700 is arranged between the light plate 310 and the connecting portion 110. On the one hand, the buffer member 700 is arranged in the gap 320 to prevent the overheating and expansion of light plate 310 from causing the pressure bar 100 to be squeezed and deformed. On the other hand, when the position of the light plate 310 changes after expansion and cooling, the light plate 310 can be restored to its original position through the deformation of the buffer member 700. The buffer member 700 includes elastic structures such as sponges and springs, which are not limited herein. The buffer member 70 is fixedly connected to the connecting portion 110, and of course the buffer member 70 may also be fixed to the light plate 310.

Further, a groove 710 can be provided at the position of the buffer member 70 corresponding to the side wall of the connecting portion 110, and the buffer member 70 can be arranged in the groove 710. Furthermore, the buffer member 70 protrudes from the opening position of the groove 710, that is, the length of the buffer member 70 along the depth direction of the groove 710 is greater than the depth of the groove 710, so as to ensure that the light plate 310 can contact the buffer member 70, and also reduce the thickness of the connecting portion 110.

In addition, in the present application, buffer members 70 are provided on both sides of the connecting portion 110 at positions corresponding to the light plates 310, and the grooves 710 on both sides of the connecting portion 110 are arranged in a misaligned manner. The direction of the misalignment may be the misalignment relative to the length direction of the gap 320, so as to ensure that the buffer members 700 are located between the connecting portion 110 and the light plates 310. That is, the projections of the grooves 710 in the connecting portion 110 that are respectively adjacent to the light plates 310 on both sides onto the connecting portion 110 do not overlap. In this way, there is no need for a connecting portion 110 that is relatively thick, and the width of the gap 320 is not increased.

Embodiment 2

Figure 7:
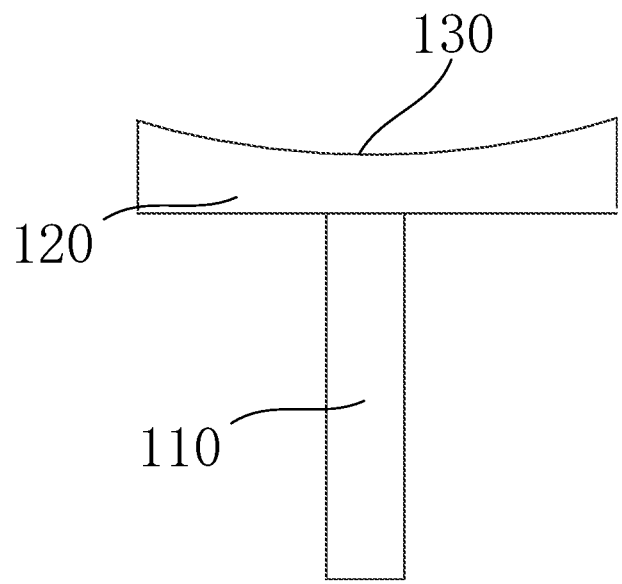
FIG. 7 is a schematic diagram of a pressure bar according to a second embodiment of the present application.

FIG. 7 is a schematic diagram of a pressure bar according to a second embodiment of the present application. As shown in FIG. 7, the difference between this embodiment and the first embodiment is that the upper surface of the fixing portion 120 is indented toward the back plate 400 to form an arc structure 130. By arranging the upper surface of the fixing portion 120 to be concave downward, the light emitted by the light plate 310 can be focused above the fixing portion 120, which better solves the problem of dark lines appearing at the gap 320 when the display device 10 displays an image.

Embodiment 3

Figure 8:
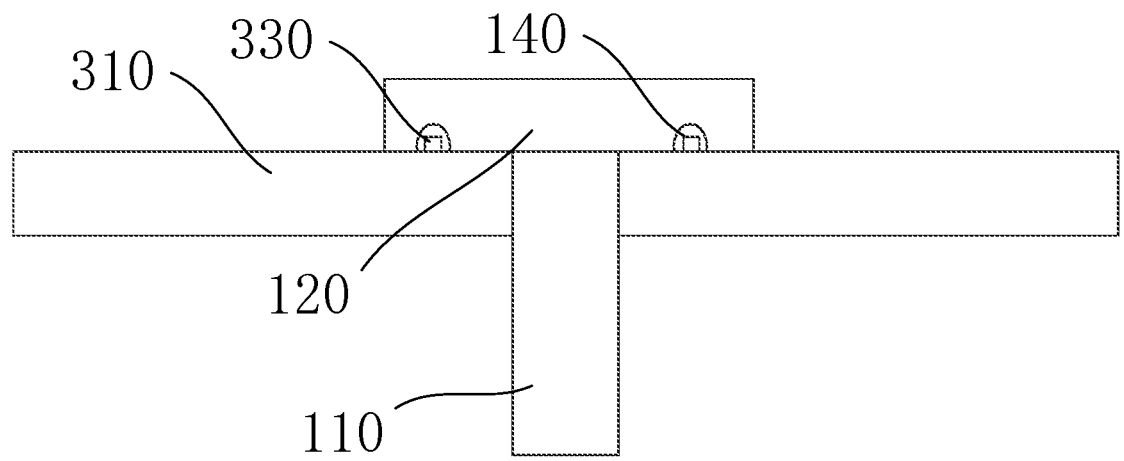
FIG. 8 is a schematic diagram of a pressure bar according to a third embodiment of the present application.

FIG. 8 is a schematic diagram of a pressure bar according to a third embodiment of the present application. As shown in FIG. 8, the difference between this embodiment and the first embodiment is that the pressure bar 100 covers at least one row of lamp beads 330 on the light plates 310. The fixing portion 120 is made of a transparent material, the light of the lamp beads 330 can be diffused outward through the fixing portion 120, and an avoidance groove 140 is set at the position of the fixing portion 120 corresponding to each lamp bead 330 to prevent the fixing portion 120 from crushing the lamp bead 330. The connecting portion 110 can also be made of a transparent material. The connecting portion 110 and the fixing portion 120 are integrally formed, which reduces the difficulty of manufacturing the pressure bar 100.

Embodiment 4

Figure 9:
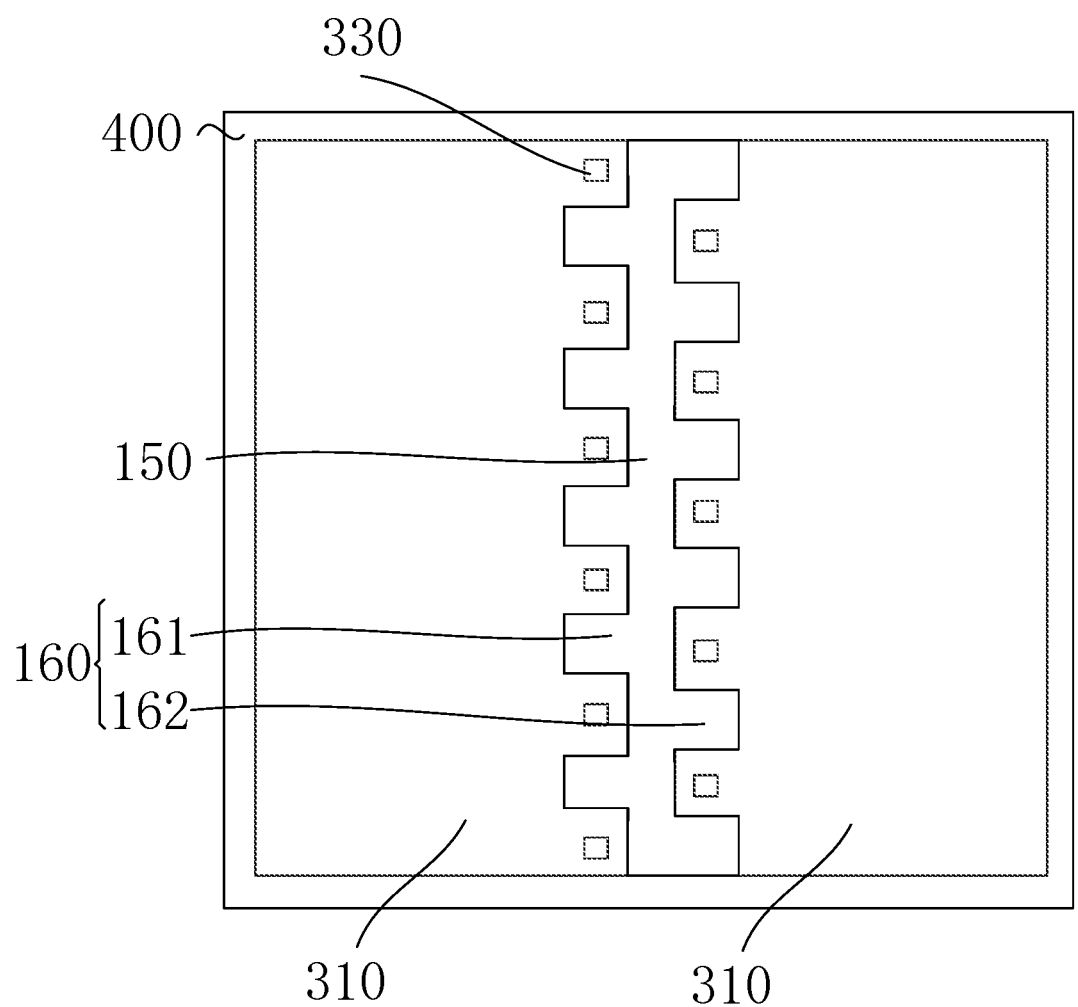
FIG. 9 is a schematic diagram of a pressure bar according to a fourth embodiment of the present application.

FIG. 9 is a schematic diagram of a pressure bar according to a fourth embodiment of the present application. As shown in FIG. 9, the difference between this embodiment and the first embodiment is that the fixing portion 120 is a sawtooth structure. Specifically, the fixing portion 120 includes a main body structure 150 and a plurality of protruding structures 160 disposed on the main body structure 150. The main body structure 150 covers the gap 320. The plurality of the protruding structures 160 are equally spaced and arranged on each of both sides of the main body structure 150, and abut on the light-emitting surfaces of the light plates 310. A lamp bead 330 is disposed on the to the light plate 310 between the two adjacent protruding structures 160.

Further, the protruding structure 160 includes a first protruding portion 161 and a second protruding portion 162. The first protruding portion 161 and the second protruding portion 162 are respectively disposed on both sides of the main body structure 150, and the second protruding portion 162 is correspondingly disposed in the middle of the two adjacent first protruding portions 161, so that the effect of the supplementary light is more uniform.

Embodiment 5

Figure 10:
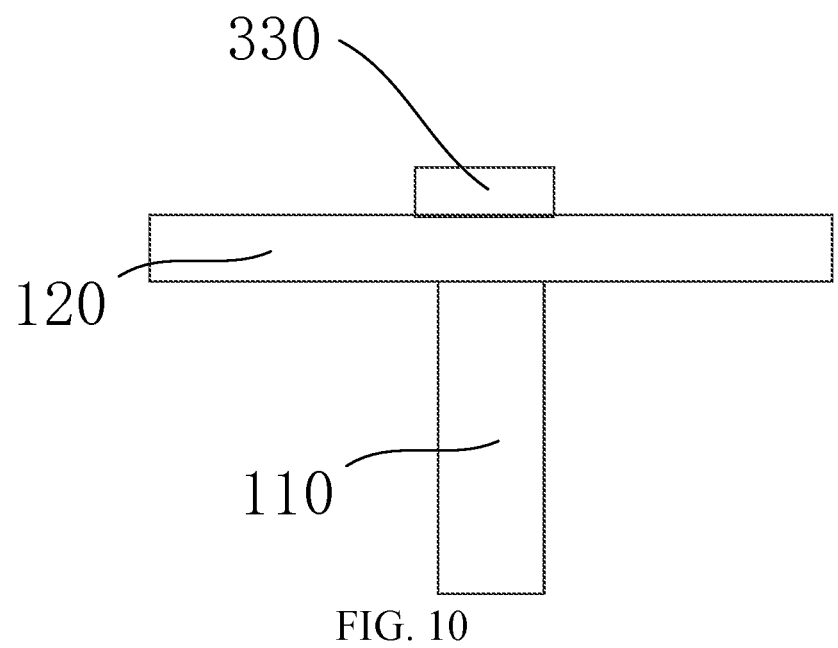
FIG. 10 is a schematic diagram of a pressure bar according to a fifth embodiment of the present application.

FIG. 10 is a schematic diagram of a pressure bar according to a fifth embodiment of the present application. As shown in FIG. 10, the difference between this embodiment and the first embodiment is that the pressure bar 100 further includes a plurality of lamp beads 330. The plurality of the lamp beads 330 are arranged on the fixing portion 120, and are evenly arranged on the upper surface along the length direction of the gap 320. That is, it can be understood as a pressure bar 100 with its own lamp beads 330, and the brightness of the lamp beads 330 can be adjusted, which solves the problem of dark lines at the position corresponding to the gap 320 when the display device 10 displays an image. It should be noted that the lamp beads 330 on the fixing portion 120 only need to avoid the position of the support column 600. That is, the support column 600 can be arranged between two adjacent lamp beads 330. In addition, in order to prevent the support column 600 from blocking the light of the lamp bead 330, the support column can be made of a transparent material.

Embodiment 6

Figure 11:
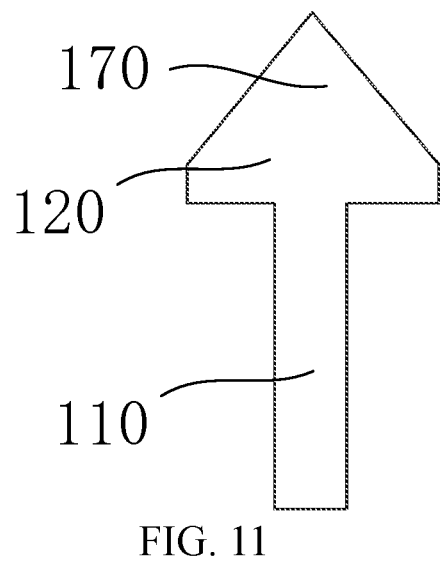
FIG. 11 is a schematic diagram of a pressure bar according to a sixth embodiment of the present application.

FIG. 11 is a schematic diagram of a pressure bar according to a sixth embodiment of the present application. As shown in FIG. 11, the difference between this embodiment and the first embodiment is that the pressure bar 100 further includes a triangular prism 170. The triangular prism 170 is arranged on the upper surface of the fixing portion 120. The triangular prism 170 and the pressure bar 100 are integrally formed. The focusing triangular prism 170 supplements light for the gap 320. The triangular prism 170 can refract the light emitted by the light plates 310 to supplement light for the gap 320 of the display device 10 to solve the problem of dark lines appearing at the gap 320 when the display device 10 displays an image.

It should be noted that the inventive concept of the present application can form a large number of embodiments, but they cannot be enumerated because the length of the application document is limited. The technical features as set forth herein can be arbitrarily combined to form a new embodiment, and the original technical effects may be enhanced after various embodiments or technical features are combined.

The technical solutions of the present application may be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, the above solutions are also applicable to other types of display panels, such as OLED (Organic Light-Emitting Diode) display panels.

The foregoing is a further detailed description of the present application in conjunction with specific optional embodiments, but it should not be construed as that the specific implementation of the present application will be limited to these descriptions. For those having ordinary skill in the technical field to which this application pertains, numerous simple deductions or substitutions may be made without departing from the concept of this application, which shall all be regarded as falling in the scope of protection of this application.

What is claimed is:

1. A display device, comprising a display panel and a backlight module, wherein the backlight module is configured provide a backlight source for the display panel;

wherein the backlight module comprises a back plate and an assembled light plate, wherein the assembled light plate is made up of a plurality of light plates, and wherein a gap is defined between every two adjacent light plates;
- wherein backlight module further comprises a pressure bar, and the assembled light plate is fixed to the back plate through the pressure bar;
- wherein the pressure bar comprises a fixing portion and a connecting portion, and wherein one end of the connecting portion passes through the gap, and the other end is connected to the fixing portion;
- wherein the fixing portion extends from the gap to the light plates on both sides to form a first abutting portion and a second abutting portion, wherein surfaces of the first abutting portion and the second abutting portion adjacent to the respective light plates are level and flush with each other; wherein the first abutting portion and the second abutting portion respectively abut and firmly press light emitting surfaces of the light plates on both sides;
- wherein the fixing portion covers the entire gap;
- wherein a light supplementation structure is arranged on a surface of the fixing portion away from the connecting portion;
- wherein the pressure bar further comprises a plurality of lamp beads that are arranged on the fixing portion and are uniformly arranged on a surface of the fixing portion away from the connecting portion along a length of the gap.

2. A backlight module, comprising a back plate and an assembled light plate, wherein the assembled light plate is made up of a plurality of light plates, and wherein a gap is defined between every two adjacent light plates;
- wherein backlight module further comprises a pressure bar, and the assembled light plate is fixed to the back plate through the pressure bar;
- wherein the pressure bar comprises a fixing portion and a connecting portion, and wherein one end of the connecting portion passes through the gap, and the other end is connected to the fixing portion;
- wherein the fixing portion extends from the gap to the light plates on both sides to form a first abutting portion and a second abutting portion, wherein surfaces of the first abutting portion and the second abutting portion adjacent to the respective light plates are level and flush with each other; wherein the first abutting portion and the second abutting portion respectively abut and firmly press light emitting surfaces of the light plates on both sides;
- wherein the fixing portion covers the entire gap;
- wherein a light supplementation structure is arranged on a surface of the fixing portion away from the connecting portion;
- wherein the pressure bar further comprises a plurality of lamp beads that are arranged on the fixing portion and are uniformly arranged on a surface of the fixing portion away from the connecting portion along a length of the gap.

3. The backlight module of claim 2, wherein the light supplementation structure comprises a reflective coating, a reflective film, or a photoluminescent agent.

4. The backlight module of claim 2, wherein a surface of the fixing portion away from the connecting portion is indented toward the back plate to form an arc structure.

5. The backlight module of claim 2, further comprising an optical film and a support column, wherein the optical film is arranged on the side of the assembled light plate away from the back plate, wherein the support column is arranged between the optical film and the fixing portion, wherein one end of the support column is connected to the fixing portion, and the other end supports the optical film, wherein a depth of the support column connected to the fixing portion along a direction from the optical film to the back plate is adjustable.

6. The backlight module of claim 5, wherein the support column is made of a transparent material.

7. The backlight module of claim 2, wherein a through slot is defined in the back plate at a position corresponding to the connecting portion, and a pressure bar fixing protrusion is arranged on the side of the back plate away from the assembled light plate; wherein the pressure bar fixing protrusion is arranged at a slot edge position of the through slot, and wherein the connecting portion passes through the through slot and is fixedly connected with a side surface of the pressure bar fixing protrusion.

8. The backlight module of claim 2, further comprising a buffer member that is disposed in the gap and between the connecting portion and the respective light plate.

9. The backlight module of claim 8, wherein the buffer member comprises an elastic structure, the elastic structure comprising as a sponge or a spring.

10. The backlight module of claim 8, wherein a groove is defined at a position of the buffer member corresponding to a side wall of the connecting portion, wherein the buffer member is arranged in the groove, and wherein a length of the buffer member along a depth direction of the groove is greater than a depth of the groove.

11. The backlight module of claim 10, wherein the buffer members are disposed on both sides of the connecting portion at positions corresponding to the light plates, and wherein the grooves on both sides of the connecting portion are disposed in a misaligned manner.

12. The backlight module of claim 2, wherein the fixing portion is made of a transparent material.

13. The backlight module of claim 12, wherein the pressure bar covers at least one row of lamp beads on the light plate, and an avoidance groove is arranged at a position of the fixing portion corresponding to each lamp bead.

14. The backlight module of claim 2, wherein the fixing portion further comprises a main body structure and a plurality of protruding structures disposed on the main body structure, wherein the main body structure covers the gap, wherein the plurality of protruding structures are evenly arranged on each of both sides of the main body structure, and the sides of the plurality of protruding structures abutting on the light-emitting surfaces of the light plates are level and flush with each other; wherein a lamp bead is arranged on the respective light plate between two adjacent protruding structures on a same side of the main body structure.

15. The backlight module of claim 14, wherein the protruding structure comprises a first protruding portion and a second protruding portion, wherein the first protruding portion and the second protruding portion are respectively disposed on both sides of the main body structure, and wherein the second protruding portion is correspondingly disposed in a middle of two adjacent first protruding portions.

16. The backlight module of claim 2, wherein the brightness of the lamp beads is adjustable.

17. The backlight module of claim 2, wherein the pressure bar further comprises a triangular prism arranged on an upper surface of the fixing portion; wherein the triangular prism and the pressure bar are integrally formed, and the triangular prism is configured to supplement light for the gap.

18. A backlight module, comprising a back plate and an assembled light plate, wherein the assembled light plate is made up of a plurality of light plates, and wherein a gap is defined between every two adjacent light plates;

wherein backlight module further comprises a pressure bar, and the assembled light plate is fixed to the back plate through the pressure bar;

wherein the pressure bar comprises a fixing portion and a connecting portion, and wherein one end of the connecting portion passes through the gap, and the other end is connected to the fixing portion;

wherein the fixing portion extends from the gap to the light plates on both sides to form a first abutting portion and a second abutting portion, wherein surfaces of the first abutting portion and the second abutting portion adjacent to the respective light plates are level and flush with each other; wherein the first abutting portion and the second abutting portion respectively abut and firmly press light emitting surfaces of the light plates on both sides;

wherein the fixing portion covers the entire gap, and is made of a transparent material; wherein a reflective coating is coated on a surface of the fixing portion away from the connecting portion; the surface of the fixing portion away from the connecting portion is indented toward the back plate to form an arc structure;

wherein the backlight module further comprises an optical film and a support column, wherein the optical film is arranged on the side of the assembled light plate away from the back plate, wherein the support column is arranged between the optical film and the fixing portion, wherein one end of the support column is connected to the fixing portion, and the other end supports the optical film, wherein a depth of the support column connected to the fixing portion along a direction from the optical film to the back plate is adjustable; wherein a through slot is defined in the back plate at a position corresponding to the connecting portion, and a pressure bar fixing protrusion is arranged on the side of the back plate away from the assembled light plate; wherein the pressure bar fixing protrusion is arranged at a slot edge position of the through slot, and wherein the connecting portion passes through the through slot and is fixedly connected with a side surface of the pressure bar fixing protrusion; wherein the backlight module further comprises a buffer member that is disposed in the gap and between the connecting portion and the respective light plate;

wherein the fixing portion further comprises a main body structure, and a plurality of first protruding structures and a plurality of second protruding structures that are disposed on the main body structure, wherein the main body structure covers the gap, wherein the plurality of first protruding structures and the plurality of second protruding structures are respectively arranged on both sides of the main body structure, and wherein each of the plurality of second protruding portions is correspondingly disposed in a middle of two adjacent first protruding portions; wherein there is arranged a lamp bead between every two adjacent first protruding structures, and there is also arranged a lamp between every two adjacent second protruding structures;

wherein the pressure bar further comprises a plurality of lamp beads that are arranged on the fixing portion and are uniformly arranged on a surface of the fixing portion away from the connecting portion along a length of the gap; wherein the lamp beads on the pressure bar and the support column are designed to avoid each other.

* * * * *